United States Patent [19]
Bruce

[11] Patent Number: 5,946,086
[45] Date of Patent: Aug. 31, 1999

[54] OPTICAL MEAN POWER CONTROLLER WITH PROVISIONABLE OUTPUT LEVELS

[75] Inventor: Paul Alan Bruce, Nepean, Canada

[73] Assignee: Northern Telecom Limited, Montreal, Canada

[21] Appl. No.: 08/988,392

[22] Filed: Dec. 10, 1997

[51] Int. Cl.[6] ..................................................... G01J 1/02
[52] U.S. Cl. ...................... 356/243.8; 356/394; 356/229; 356/230
[58] Field of Search ............................... 356/243.8, 394, 356/229, 230

[56] References Cited

U.S. PATENT DOCUMENTS 4,927,266   5/1990   Sugiura et al. .......................... 356/243

FOREIGN PATENT DOCUMENTS 2220092   12/1989   United Kingdom .

*Primary Examiner*—Robert Kim
*Assistant Examiner*—Reginald A. Ratliff

[57] ABSTRACT

A mean optical power controller that controls power using a voltage controlled optical attenuator (VCOA) is disclosed. This controller uses a control loop in which a signal indicative of the present optical power level is compared to a signal indicative of the desired optical power level, with the difference then being used as input into the VCOA. This controller generates the required variety of signals indicative of the desired optical power level, or reference signals, without having to rely on a CPU. It does this by storing in a local storage means the voltage-values of the reference signals required to realize each supported user-defined optical power level. During the operation of the controller, the voltage-value corresponding to each selected power-level is passed to one or more DACs, where it is converted into a reference signal. A plurality of DACs can be used, which each convert a fraction of each voltage-value, so as to implement a logarithmic relation between the user-defined power levels and the voltage-values. This provides fine control over the optical power level, over a sufficiently large range of values.

20 Claims, 3 Drawing Sheets

OPTICAL MEAN POWER CONTROLLER WITH PROVISIONABLE OUTPUT LEVELS

FIELD OF THE INVENTION

This invention relates to an improved optical signal generating apparatus and, more particularly, to an optical signal generating apparatus for outputting signals whose optical power-level is equivalent to an externally set optical power-level.

BACKGROUND OF THE INVENTION

The mean power-level of an optical signal generator, also referred to as the optical power level herein, lies halfway between the power-level of the generator's output when an 0-bit is being transmitted and the power level of its output when a 1-bit is being transmitted. It is desirable to accurately control the mean power-level of a generator so as to set it to a desired value, and more particularly to control the mean power-level so as to set it to one of a range of power levels.

Some previous optical power controllers are implemented as variable power-level laser diodes. An example of this sort of controller is described in United Kingdom Patent Application 2,220,092A, published on Dec. 28, 1989, in the name of STC PLC. Such controllers react to discrepancies between the mean power-level and a desired power-level by adjusting the injection current of the laser diode. One problem with such systems however, is that the injection current cannot be significantly adjusted without adversely affecting the extinction ratio of the laser diode. This problem limits the range of power-levels supported by such power controllers, and requires the addition of an extinction ratio control loop to the design. Another problem with systems that adjust the injection current of the laser diode, is that the injection current cannot be tuned for wavelength locking purposes as it is being tuned to control optical power.

Other known controllers do not operate by adjusting the injection current going into the laser diode, and thus do not adversely affect the extinction ratio of the generator. Their operation involves having the laser diode generate a constant-power optical signal, and then varying that signal's mean power level using a voltage controlled optical attenuator (VCOA) positioned at the output of the laser diode. That is, such controllers react to discrepancies between the actual mean power level and a desired mean power level by adjusting the attenuation imposed on the signal by the VCOA.

Even these other systems however, have key problems. One problem is that the relationship between a desired change in the power-level of the VCOA output, and the change in the control signal voltage required to effect that power-level change, is complex. This makes it difficult to generate the required variety of control voltages without the use of some processing means for performing operations such as interpolation.

Another problem is that the relation between a desired change in the power level of the VCOA output which is specified in dBm units, and the change in the control signal voltage required to effect that power level change, which is expressed in volts, is logarithmic. If the former quantity is represented by the variable, y, and the latter by the variable, x, the relation can be described as follows:

$$y=10 \log (Cx/1mW);$$

C is some constant number The logarithmic relation between x and y means that the power controller must generate, on one hand, high resolution control voltages that extend over a relatively small voltage range in order to attain all the smaller desired power levels. The relation means, at the same time, that the power controller must generate, on the other hand, low resolution control voltages that extend over a relatively large voltage range in order to attain the greater desired power levels.

At least one alternative optical power controller makes use of a VCOA while effectively avoiding these problems. Such a controller is taught by U.S. Pat. No. 4,927,266, by Sugiura et al. issued on May 22, 1990, and involves generating a plurality of control signals of varying resolutions. These control signals are used as inputs into one or more VCOAs tuned at varying resolutions, and a variable injection current source for driving a light source. Such systems however, require a control processor unit (CPU) to generate the plurality of control signals. This, in turn, drives up the cost of the power controller, as well as the amount of space it must occupy.

The system disclosed in U.S. Pat. No. 4,927,266 has further drawbacks. For example, it varies the injection current to achieve fine-resolution control over the optical power. As described earlier, this feature is undesirable as it rules out varying the injection current for wavelength locking purposes.

Therefore, at present, an optical mean power controller is required that can generate the required variety of control voltages for input into the VCOA at a sufficiently high resolution over a desired range, without needing to make use of a CPU.

SUMMARY OF THE INVENTION

According to one aspect, the present invention provides an optical signal generator comprising: a light source for generating an optical signal; an optical power-adjusting apparatus for adjusting the optical power-level of the optical signal before it exits the generator; an optical power-monitoring apparatus for monitoring the actual power-level of the optical signal outputted by the optical power-adjusting apparatus and generating from said power-level a related present-level signal; a comparator for comparing the present-level signal to a reference signal in order to supply a control signal to the optical power-adjusting apparatus that causes the present-level signal to be set equal to the reference signal; and an optical power-setting apparatus for generating the reference signal for use by the comparator, such that the comparator causes the optical power-adjusting apparatus to adjust the power-level of the optical signal to equal a user-defined power-level.

In a preferred embodiment, the optical power-setting apparatus comprises: a digital controller for receiving user-defined power levels; a storage means connected to the digital controller, and containing a table that maps values specifying user-defined power levels to values specifying the reference signal needed to realize said user-defined power levels; and at least one digital to analogue signal converter (DAC) connected to the storage means for converting the values specifying the reference signal into reference signals.

Preferably, there are two or more DACs which access respective pages of the storage means, each page holding a fraction of the reference signal value, and the DAC outputs being summed to provide the reference signal. This provides fine control over the optical power level, over a large range of values.

BRIEF DESCRIPTION OF THE DRAWINGS

Embodiments of the invention will now be disclose with reference to the accompanying drawings in which.

DETAILED DESCRIPTION OF THE PREFERRED EMBODIMENTS

Figure 1:
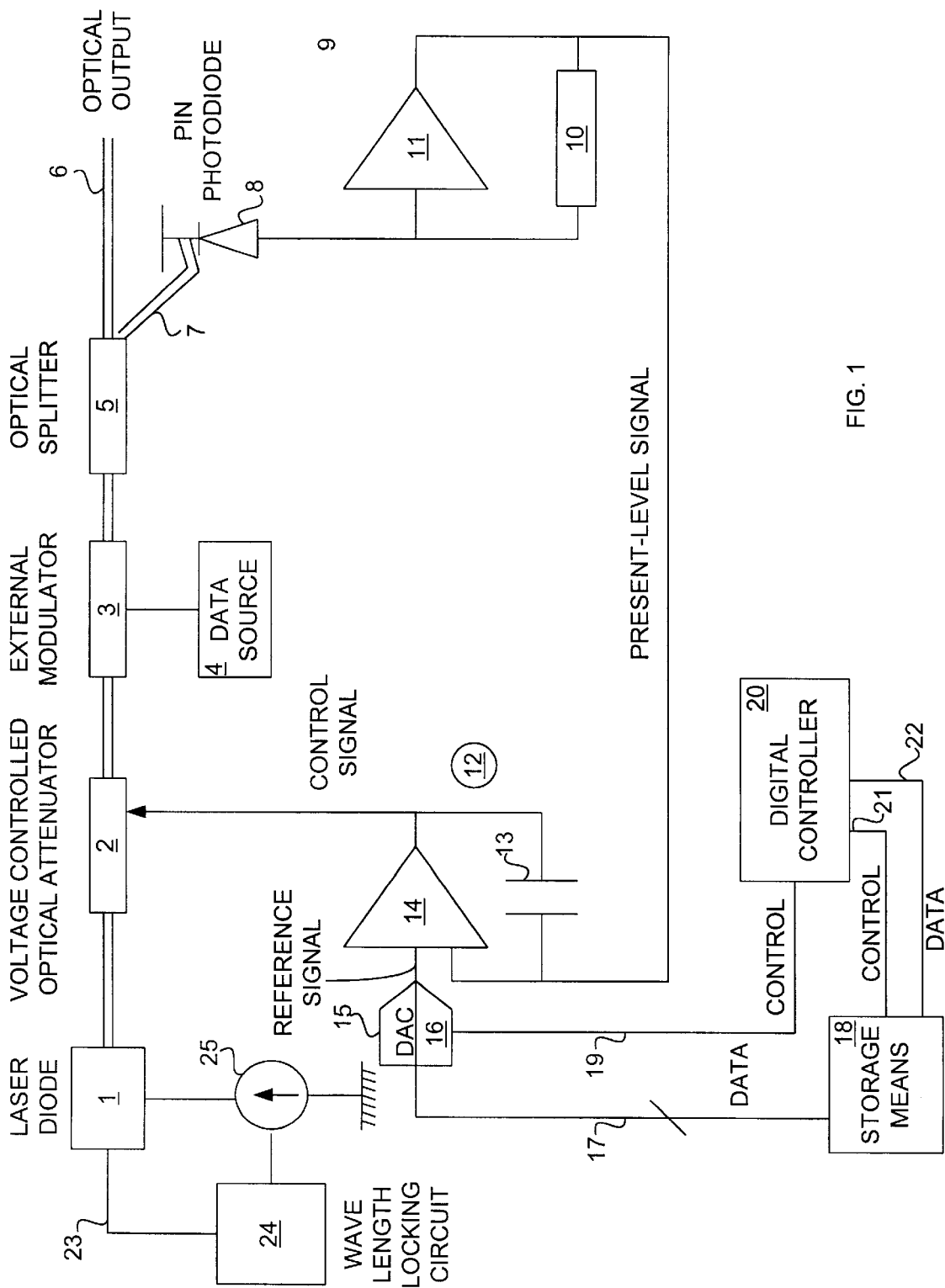
FIG. 1 is a high-level block diagram of an optical generator that uses a voltage controlled optical attenuator (VCOA) to effect power control.

Referring to FIG. 1, an optical signal generator includes a continuous wave (CW) light source 1 such as a laser diode, connected to a voltage controlled electro-absorptive optical attenuator (VCOA) 2, which is connected to an external Mach-Zehnder or electro-absorptive (EA) modulator 3 driven by a data source 4. The output of the modulator is connected to an optical splitter 5, which has a main optical output 6 and a feedback optical output 7. The feedback optical output 7 leads to a mean optical power control portion of the optical signal generator.

The mean optical power control portion includes a PIN photodiode 8, connected at its input to the feedback optical output 7, and connected at its output to a transimpedance amplifier 9. The transimpedance amplifier 9 consists of a resistor 10 connected across an operational amplifier 11. The output of the transimpedance amplifier 9 is connected to one input of an integrator 12, which consists of a capacitor 13 connected across a second operational amplifier 14. The outputs of two 8-bit digital-to-analogue converters (DACs) 15, 16, are connected through a resistance which in the interests of simplicity is not illustrated until FIG. 3, to the other input of the integrator 12. The output of the integrator is connected to a control signal input of the VCOA 2. The DACs 15, 16 are connected through a data signal bus 17 to a storage means 18, which is implemented by an electrically erasable programmable read-only memory (EEPROM). The DACs 15, 16 are also connected through a control signal connection 19 to a digital controller 20, which is implemented by an electrically programmable logic device (EPLD). The digital controller 20 is also connected to the storage means 18 through both a second data signal connection 21 and control signal connection 22.

The laser diode 1 is also connected, through a back-facet connection 23, to a wavelength locking circuit 24. The wavelength locking circuit 24 is connected to a voltage controlled current source 25, which is connected to the laser diode 1.

The laser diode 1 supplies to the VCOA 2 an unmodulated optical signal with a mean power-level that varies with respect to time and temperature. The VCOA 2 attenuates the signal so as to change its mean power-level. The change effected by the VCOA 2 is determined by the voltage of a control signal that is sent from the integrator 12. The attenuated optical signal is sent from the VCOA 2 to the external modulator 3, which modulates the signal with data from the data source 4. The modulated signal is then passed through the splitter 5, which diverts a small percentage of the signal onto the active surface of the PIN photodiode 8 for feedback purposes. The PIN photodiode 8 converts the optical power impinging on its active surface into a photocurrent that is proportional to the mean power-level of the optical signal. Since the effects of the external modulator 3 on the optical signal lie outside the bandwidth of the PIN photodiode 8, the photocurrent is not significantly affected by the action of the modulator 3. This photocurrent is sent to the transimpedance amplifier 9, which outputs a present-level signal as a voltage that is linearly related to the photocurrent. This means that the voltage of the present-level signal is a function of the mean power-level of the optical signal being output by the optical generator.

The present-level signal is sent as an input into the integrator 12, along with a reference signal which is received from the DACs 15, 16. The reference signal represents the desired mean power-level of the optical signal. The integrator 12 does two things with these signals:

(i) It determines the difference between the voltage of the present-level signal and the voltage of the reference signal, in order to output a control signal that has a voltage which is directly related to the difference between the actual power-level, and the desired-mean power level, of the optical output.

(ii) It integrates the difference between the present-level signal and reference signal in order to filter from the control signal the effect of optical power fluctuations, which could be attributable to any of the following factors: changes in temperature, the changing characteristics of the aging laser diode 1, the action of the external modulator 3, and/or the action of the wavelength locking circuit 24.

Accordingly, the degree of attenuation effected by the VCOA 2 is directly related to the difference between the actual mean power-level, and the desired mean power-level, of the optical output. The VCOA 2 continues to adjust the actual mean power-level until it equals the desired mean-power level. It is to be noted at this point, that the mean power-level is controlled in the generator of FIG. 1 without adjusting the voltage controlled current source 25, which is used for wavelength locking.

The method by which the reference signal is generated from a desired mean power-level, will now be explained. As described hereinafter, the user inputs a desired mean power-level through the digital controller 20. The desired mean power level is passed as a digital signal from the digital controller 20 to the storage means 18. The storage means 18 contains, for each desired mean power level that is supported by the mean optical power control portion, a reference signal voltage that should be fed into the integrator 12 in order to sustain that mean power-level at the output 6 of the generator. Upon receipt of a desired mean-power level value from the digital controller 20, the storage means 18 thus outputs a digital signal indicating the requisite voltage of the reference signal. The DACs 15, 16 take this digital signal as input, and output an analogue signal whose voltage equals the required reference signal voltage, $V_{ref}$.

Figure 2:
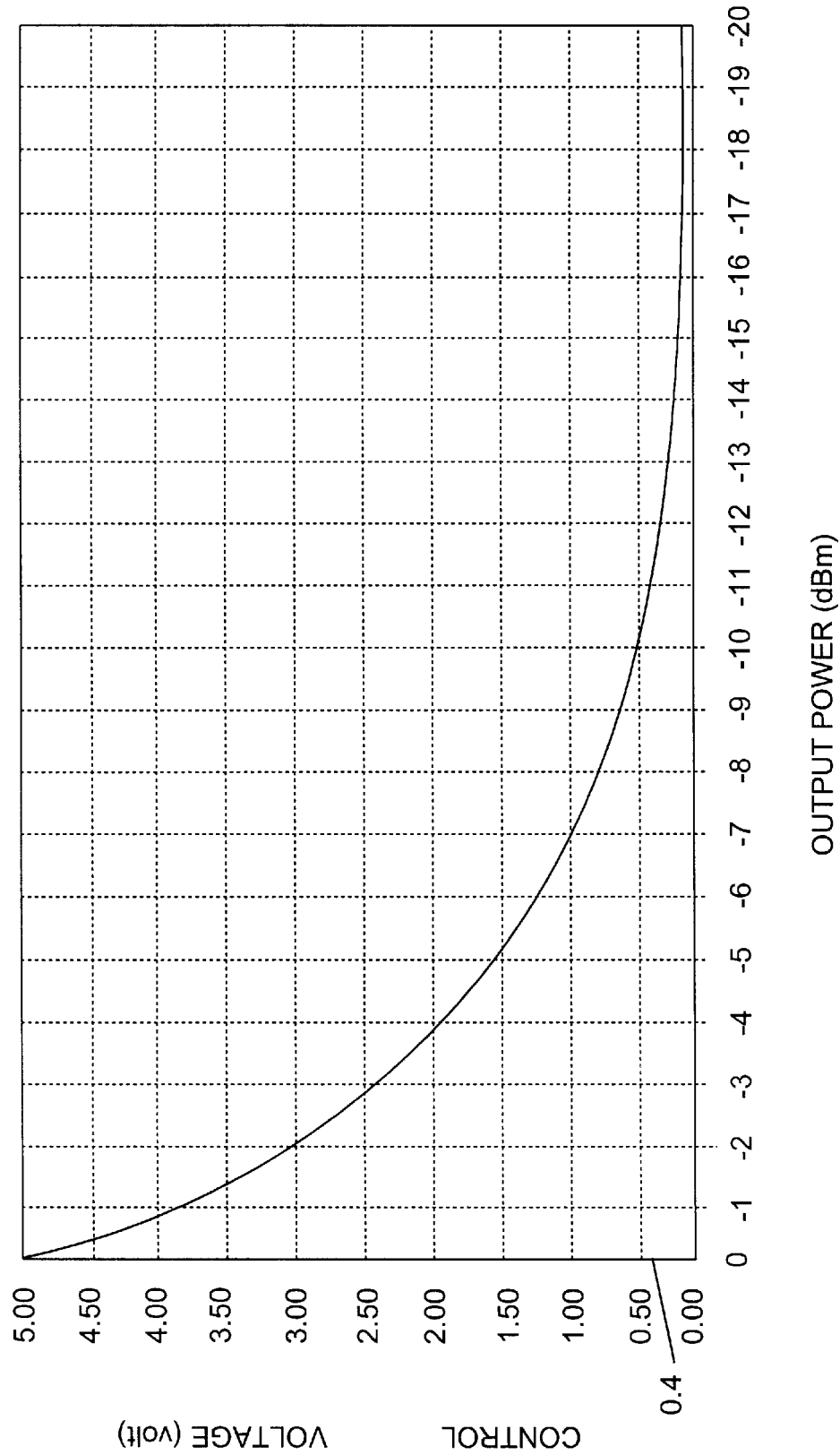
FIG. 2 is a graph plotting the requested mean power-level of the output of the generator of FIG. 1, against the corresponding control voltage that must be applied to the VCOA of FIG. 1 in order to achieve the requested power level.

The precise configuration and operation of the control loop will be described with reference to FIG. 3. Reference is first made to FIG. 2 however, in order to better explain the problem of implementing the aforementioned logarithmic relation.

FIG. 2 illustrates a plot of, on the x-axis, power-levels supported by a given controller, against on the y-axis, the corresponding control voltages that must be applied to the controller's VCOA 2 for the generator to output optical signals at each supported power-level. The former variable ranges in value from −1 dBm to −11 dBm. The latter variable roughly ranges in value from 5 V to 0.4 V. FIG. 2 clearly shows the logarithmic relation between the two variables. An accurate and economical reference signal generator that implements this relation is difficult to achieve without the use of CPUs, because it would have to simultaneously be able to generate high resolution control voltages that extend over a relatively small voltage range in order to output all the smaller desired power levels (e.g. in the −5 dBm to −11 dBm range), as well as low-resolution control voltages that extend over a large voltage range in order to output all the larger desired power levels (e.g. in the 0 dBm to −5 dBm range). For example, while the same system would have to be able to specify control voltages ranging from 4.8 volts to 1 volt in order to output power levels ranging from 0 to −7 dBm, it would also have to specify control voltages to a resolution of roughly 100 $\mu$V to support a 0.1 dBm step-size between the lowest supported power-levels. More precisely, assuming that a 4.8 mV step is required for the given controller of FIG. 2 to support a transition from −10.9 dBm to −11 dBm, the control voltages must be definable to a resolution of 100 $\mu$V for calibration purposes. This resolution of 100 $\mu$V per 0.1 dBm step-size in power-level, if implemented over the entire required operating range shown in FIG. 2, would require either one 16-bit DAC or two parallel 8-bit DACs.

Figure 3:
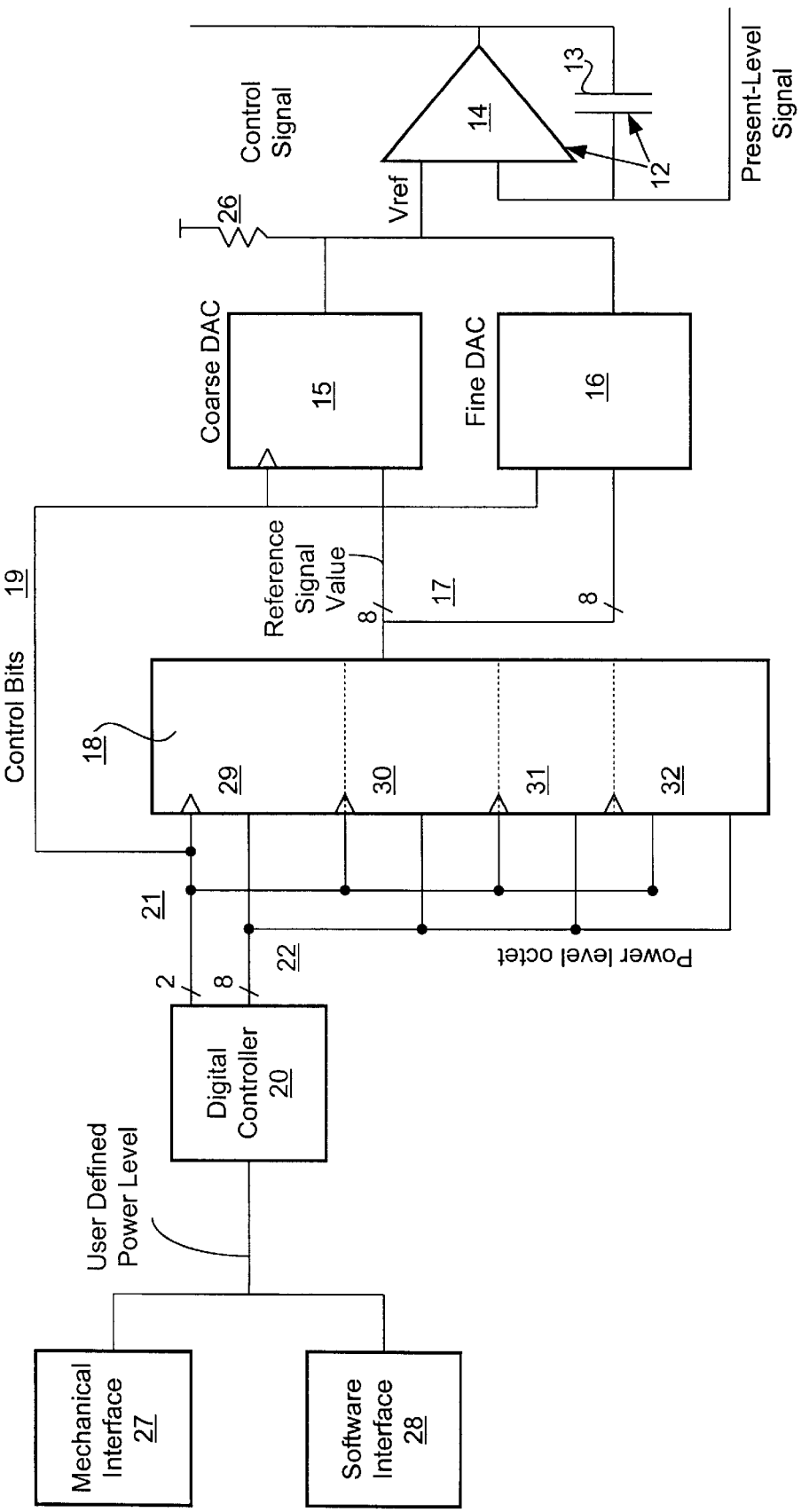
FIG. 3 is a more detailed view of the part of the generator of FIG. 1 that is responsible for generating a reference signal voltage.

FIG. 3 illustrates one embodiment of an elegant cost-effective solution to the problem posed by the relation shown in FIG. 2. More specifically, FIG. 3 contains a view of the part of the mean optical power control portion that generates the reference signal used for comparisons by the integrator 12. It is assumed that the controller of FIG. 3 is designed to control an optical generator and VCOA that exhibit the behaviour illustrated in FIG. 2, and that the controller must support power level jumps in 0.1 dBm steps between −1 dBm and −11 dBm.

All of the elements illustrated in FIG. 3 are also illustrated in FIG. 1, with the exception of a resistance 26 that is attached to the output of the two DACs 15, 16, and a hardware interface 27 and software interface 28 which are both used to obtain user-defined desired mean power-levels. Another change with respect to FIG. 1 is that the two 8-bit DACs have been given their own names, one being the coarse DAC 15 and the other being the fine DAC 16. A final change with respect to FIG. 1, is that the view of the storage means 18 is expanded to show four memory pages, 29, 30, 31, 32, that comprise it. The memory pages all map requested power-levels to control voltages, both values being specified using 8-bit numbers. Two of these pages 30 and 32, the coarse-resolution pages, contain coarse-resolution portions of control voltages for desired power-levels. These portions have a resolution of 0.0195 V/bit (5 V÷256 bits) since a range of control voltages extending about 5 V must be supported, as indicated in FIG. 2. The other two pages 29 and 31, the fine-resolution pages, contain fine-resolution portions of control voltages for desired power-levels. These portions can have a resolution of 76.3 $\mu$V/bit (0.0195 V÷256 bits), which is less than the required resolution of 100 $\mu$V/bit, which as mentioned previously is required to support the power level jump between −10.9 dBm and −11 dBm for the generator and VCOA used to generate FIG. 2.

The circuit illustrated in FIG. 3 operates according to the following method. The digital controller receives the user-defined desired power level value from either the mechanical user interface 27, or the software user interface 28. The user-defined power-level value is converted by the digital controller 20 into an 8-bit value, hereinafter the power-level octet. The power-level octet is used to access the proper entries inside the storage means 18, which hold binary numbers specifying the calibrated reference signal voltage values that are required to be sent to the integrator 12 input for the VCOA 2 to output the user-defined mean power-level.

More specifically, each power level octet is used to access specific records within two of the four pages of the storage means 18. The two-pages that are searched are determined based on the source of the request. If the request comes from the mechanical interface 27, for example, the relevant reference signal voltages would be held in the upper two pages 29, 30, of the storage means 18. If the request comes from a software interface 28, the relevant reference signal voltage values would be held in the lower two pages 31, 32, of the storage means 18. Separate memory pages are maintained for each source of user-defined mean power-levels, because each can use differing numbers to specify requests for the same given power-level.

Once the two memory pages to be accessed are identified, they are sequentially scanned using the same power-level octet. Assuming the software interface 28 is in use, the first page that is searched, the fine-resolution page 31, maps the requested power-level to the least significant bits of the binary number specifying the reference signal voltage value for that power level. The second page that is searched, the coarse-resolution page 32, maps the same power level to the most significant bits of the binary number specifying the reference signal voltage value for that power level. For example, if a requested power-level requires a reference signal voltage of 2.46267 V, the entry in the coarse-resolution page 32 would hold a value corresponding to a voltage of 2.460 V (a count of 126), while the entry in the fine-resolution page 31 would hold a value corresponding to a voltage of 0.00267 V (a count of 35). The access operations into the fine-resolution page 31 and the coarse-resolution page 32, are time-division multiplexed. The timing of each operation is synchronized using the control bits that are exchanged between the storage means 18 and the digital controller 20.

After each access operation, an octet representing a required voltage for the reference signal, hereinafter a reference signal value, is transferred from the accessed page into one of the two DACs. More specifically, the reference signal value from the fine-resolution page 31 is transferred into the fine DAC 16, while the reference signal value from the coarse-resolution page 32 is transferred into the coarse DAC 15. Each pair of transfers is achieved across the data signal bus 17, which is 8 bits wide, under time-division multiplexed control. The individual transfers are synchronized using the control bits that are exchanged between the digital controller 20 and the DACs 15, 16. Once a pair of reference signal values have been transferred to the DACS 15, 16, the values are then converted into analogue signals. The analogue signal output by each DAC 15 or 16 has a current that is proportional to the reference signal value received by that DAC 15 or 16.

The currents of both DAC analogue signals are then summed into the resistor 26, such that a desired reference signal voltage is generated which has a high degree of resolution, and which can potentially take-on a broad range of values.

It is to be noted that by using multiple memory pages and DACs that are collectively configured to yield high resolution control over a broad range of optical power levels, the controller does not require a CPU to implement the log relation illustrated in FIG. 2. It also is to be noted that by storing all the reference signal voltage values necessary to accurately generate each desired mean power-level, the storage means 18 negates any need for interpolation to be performed within the controller by a CPU.

It is to be noted that the use of two 8 bit DACs to implement the required resolution for the control signal, results in a significant cost-savings as compared to the use of a single 16 bit DAC to achieve the same resolution. Two 8-bit DACs are far less costly than one 16-bit DAC.

Numerous modifications and variations of the present invention are possible in light of the above teachings. It is therefore to be understood that within the scope of the appended claims, the invention may be practised otherwise than as specifically described herein. For example, the system could make use of a greater number of bits and larger DACs, it could access the storage means more than twice per requested power-level, and it could make use of a greater number of DACs, to achieve still higher resolutions over a wider range of power-levels.

Another variation involves connecting a multiple-page storage means as in the controller of FIG. 3, to a single DAC. Under this variation, multiple outputs of varying resolution would be generated by the DAC for each required reference signal, each output representing a portion of the required reference signal. Under this variation, the individual outputs of the single DAC would be sent to a variety of sample and hold blocks, so that they could be periodically summed with other recently generated individual DAC outputs, to form single reference signals.

Another variation involves relocating the means for generating a present-level signal, which primarily consists of a PIN photodiode, so that the signal is derived from laser light emerging from the back-facet of the light source. This can be achieved provided there is enough space near the back-facet of the laser for the PIN photodiode.

I claim:

1. An optical signal generator comprising;

a light source for generating an optical signal;

an optical power-adjusting apparatus for adjusting the optical power-level of the optical signal before it exits the generator;

an optical power-monitoring apparatus for monitoring the actual power-level of the optical signal outputted by the optical power-adjusting apparatus and generating from said power-level a related present-level signal;

a comparator for comparing the present-level signal to a reference signal in order to supply a control signal to the optical power-adjusting apparatus that causes the present-level signal to be set equal to the reference signal; and an optical power-setting apparatus for generating the reference signal for use by the comparator, such that the comparator causes the optical power-adjusting apparatus to adjust the power-level of the optical signal to equal a user-defined power-level, wherein the optical power-setting apparatus comprises:

a digital controller for receiving user-defined power levels;

a storage means connected to the digital controller, and containing a table that maps values specifying user-defined power levels to values specifying the reference signal needed to realize said user-defined power levels; and at least one digital to analogue signal converter (DAC) connected to the storage means for converting the values specifying the reference signal into reference signals.

2. The apparatus of claim 1 wherein a plurality of digital to analogue signal converters (DACS) is connected to the storage means, and wherein the apparatus further comprises a means for summing the outputs of the plurality of DACs, such that each DAC is only responsible for converting a fraction of each reference signal value, and such that each reference signal is obtained by summing the outputs of the DACs.

3. The apparatus of claim 2 wherein the division of reference signal values into fractions for distribution to each DAC is set so as to implement a logarithmic relation between the user-defined power-levels and the reference signal values.

4. The apparatus of claim 2 wherein the storage means is divided into a plurality of memory pages that are respectively accessible by the plurality of DACS, each page holding only a fraction of each reference signal value.

5. The apparatus of claim 4 wherein the division of reference signal values into fractions for distribution to each page is set so as to implement a logarithmic relation between the user-defined power-levels and the reference signal values.

6. The apparatus of claim 4 wherein, for each reference signal that is generated, the transfer of fractions of the reference signal value from each of the memory pages to their respective DAC is carried out across a single bus under time-division multiplexed control.

7. The apparatus of claim 2 wherein two digital to analogue sign al converters (DACs) are used, one being used to convert coarse-resolution fractions of reference signal values into fractions of reference signals, and the other being used to convert fine-resolution fractions of reference signal values into fractions of reference signals.

8. The apparatus of claim 1 wherein the storage means is divided into a plurality of memory pages that each hold only a fraction of each reference signal value, wherein a single DAC is connected to the storage means and used to convert each fraction into a portion of a reference signal, and wherein the apparatus further comprises means for sampling, holding and periodically summing the reference signal portions most recently outputted by the DAC, such that each reference signal is obtained by periodically summing the reference signal portions most recently outputted by the DAC.

9. The apparatus of claim 1 wherein the optical power-adjusting apparatus is a voltage controlled optical attenuator.

10. The apparatus of claim 1 wherein the digital controller receives user-defined power levels through a software user interface.

11. The apparatus of claim 1 wherein the digital controller receives user-defined power levels through a mechanical user interface.

12. The apparatus of claim 1 wherein the optical power-monitoring apparatus comprises a PIN diode and a transimpedance amplifier.

13. The apparatus of claim 1 wherein the comparator comprises an integrator.

14. The apparatus of claim 13 wherein the integrator comprises an operational amplifier, and a capacitor that is connected across the inverting input and the output of the operational amplifier.

15. The apparatus of claim 1 wherein the light source comprises a laser diode driven by a voltage controlled current injector.

16. The apparatus of claim 15 wherein the input of the voltage controlled current injector is varied such that the optical signal outputted by the laser diode is wavelength locked.

17. An optical signal generator comprising:

a laser diode driven by a voltage controlled current injector;

a voltage controlled optical attenuator for adjusting the optical power-level of the optical signal before it exits the generator;

a PIN diode and a transimpedance amplifier for monitoring the actual power-level of the optical signal outputted by the voltage controlled optical attenuator, and for generating from said power-level a related present-level signal;

an operational amplifier, and a capacitor that is connected across the inverting input and the output of the operational amplifier, for comparing the present-level signal to a reference signal in order to supply a control signal to the voltage controlled optical attenuator that causes the present-level signal to be set equal to the reference signal;

a digital controller for receiving user-defined power levels;

a storage means connected to the digital controller, and containing a table that maps values specifying user-defined power levels to values specifying the reference signal needed to realize said user-defined power levels; and, a digital to analogue signal converter (DAC) connected to the storage means for converting the values specifying the reference signal into reference signals.

18. The apparatus of claim 17 wherein a plurality of digital to analogue signal converters (DACs) is connected to the storage means, and wherein the apparatus further comprises a means for summing the outputs of the plurality of DACs, such that each DAC is only responsible for converting a fraction of each reference signal value, and such that each reference signal is obtained by summing the outputs of the DACs.

19. The apparatus of claim 18 wherein two digital to analogue signal converters (DACs) are used, one being used to convert coarse-resolution fractions of reference signal values into fractions of reference signals, and the other being used to convert fine-resolution fractions of reference signal values into fractions of reference signals.

20. An optical signal generator comprising:

a laser diode for generating an optical signal;

a voltage controlled current injector driving the laser diode and having an input which is varied such that the optical signal generated by the laser diode is wavelength locked;

an optical power adjusting apparatus for adjusting the optical power-level of the optical signal before it exits the generator;

an optical power-monitoring apparatus for monitoring the actual power-level of the optical signal outputted by the optical power-adjusting apparatus and generating from said power-level a related present-level signal;

a comparator for comparing the present-level signal to a reference signal in order to supply a control signal to the optical power-adjusting apparatus that causes the present-level signal to be set equal to the reference signal; and an optical power-setting apparatus for generating the reference signal for use by the comparator, such that the comparator causes the optical power-adjusting apparatus to adjust the power-level of the optical signal to equal a user-defined power-level.

* * * * *